US012694224B2

(12) United States Patent
Chang et al.

(10) Patent No.:  US 12,694,224 B2
(45) Date of Patent:  Jul. 28, 2026

(54) DETECTING RANDOM AND/OR ALGORITHMICALLY-GENERATED CHARACTER SEQUENCES IN DOMAIN NAMES

(71) Applicant: Proofpoint, Inc., Sunnyvale, CA (US)

(72) Inventors: Hung-Jen Chang, Freemont, CA (US); Gaurav Mitesh Dalal, Fremont, CA (US); Ali Mesdaq, San Jose, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 145 days.

(21) Appl. No.: 18/673,524

(22) Filed: May 24, 2024

(65) Prior Publication Data

US 2024/0311572 A1    Sep. 19, 2024

Related U.S. Application Data

(63) Continuation of application No. 17/529,947, filed on Nov. 18, 2021, now Pat. No. 12,026,469.

(60) Provisional application No. 63/143,610, filed on Jan. 29, 2021.

(51) Int. Cl.
| | |
|---|---|
| *G06F 40/30* | (2020.01) |
| *G06F 40/216* | (2020.01) |
| *G06N 20/20* | (2019.01) |

(52) U.S. Cl.
CPC ............ *G06F 40/30* (2020.01); *G06F 40/216* (2020.01); *G06N 20/20* (2019.01)

(58) Field of Classification Search
CPC .... G06N 20/20; G06N 20/00; H04L 61/3025; H04L 61/4511; H04L 63/1483; H04L 63/1408; G06F 21/577; G06F 21/554
See application file for complete search history.

(56) References Cited

U.S. PATENT DOCUMENTS

| | | | |
|---|---|---|---|
| 9,531,581 B1 | 12/2016 | Adkins, III et al. | |
| 10,609,081 B1 | 3/2020 | Appala et al. | |
| 12,026,469 B2 * | 7/2024 | Chang .................... | G06N 20/20 |
| 2013/0191915 A1 * | 7/2013 | Antonakakis ......... | G06F 21/566 726/23 |
| 2015/0358276 A1 | 12/2015 | Liu et al. | |
| 2016/0006693 A1 | 1/2016 | Salcedo | |

(Continued)

OTHER PUBLICATIONS

Heigold et al. "How Robust Are Character-Based Word Embeddings in Tagging and MT Against Wrod Scramlbing or Randdm Nouse?". Proceedings of AMTA 2018, vol. 1: MT Research Track Boston, Mar. 17-21, 2018 (Year: 2018).*

(Continued)

*Primary Examiner* — Jesse S Pullias

(74) *Attorney, Agent, or Firm* — Banner & Witcoff, Ltd.

(57)    ABSTRACT

Aspects of the disclosure relate to detecting random and/or algorithmically-generated character sequences in domain names. A computing platform may train a machine learning model based on a set of semantically-meaningful words. Subsequently, the computing platform may receive a seed string and a set of domains to be analyzed in connection with the seed string. Based on the machine learning model, the computing platform may apply a classification algorithm to the seed string and the set of domains, where applying the classification algorithm to the seed string and the set of domains produces a classification result. Thereafter, the computing platform may store the classification result.

20 Claims, 6 Drawing Sheets

(56)                  References Cited

U.S. PATENT DOCUMENTS

| | | |
|---|---|---|
| 2016/0373479 A1 | 12/2016 | Akcin |
| 2018/0351972 A1* | 12/2018 | Yu .......................... H04L 63/1416 |
| 2019/0089721 A1* | 3/2019 | Pereira .................. G06F 16/951 |
| 2019/0347571 A1 | 11/2019 | Qadir et al. |
| 2020/0267119 A1 | 8/2020 | Huffner et al. |
| 2020/0287913 A1 | 9/2020 | Buck |
| 2020/0304540 A1 | 9/2020 | Chang et al. |
| 2021/0021636 A1 | 1/2021 | Sbandi |

OTHER PUBLICATIONS

Highnam et al. "Real-Time Detection of Dictionary DGA Network Traffic using Deep Learning". arXiv:2003.12805v1 [cs.CR] Mar. 28, 2020 (Year: 2020).*

Ghosh et al. "Using Auxiliary Inputs in Deep Learning Models for Detecting DGA-based Domain Names". ICOIN 2021 (Year: 2020).*

Anderson et al. "DeepDGA: Adversarially-Tuned Domain Generation and Detection". AISec'16 (Year: 2016).*

Nov. 5, 2024—(EP) Office Action—App 21218399.0.

Jeffrey Pennington et al., "GloVe: Global Vectors for Word Representation", Web Archive webpage, Sep. 25, 2016, XP055444350, Retrieved from the Internet: URL: http;//web.archive.org/web/20160925004021/https://nlp.stanford.edu/projects/glove/ [retrieved on Jan. 25, 2018].

Khormali Amonollah et al: "Domain name system security and privacy: A contemporary survey", Computer Networks, Elsevier, Amsterdam, NL, vol. 185, Dec. 2, 2020, XP086441073, ISSN: 1389-1286, DOI: 10.1016/J.Comnet.2020.107699 [retrieved on Dec. 2, 2020].

Nov. 17, 2023—(US) Non-Final Office Action—U.S. Appl. No. 17/529,947.

Feb. 29, 2024—(US) Notice of Allowance—U.S. Appl. No. 17/529,947.

* cited by examiner

300

| Cybersecurity Customer Portal |
|---|
| Infringing Domain Alert |
| A potentially infringing domain name has been detected. Our domain security support team is working to remediate the situation and will contact you with a status update soon.<br><br>More information... \| Help |

| Domain Analysis Portal |
|---|
| Prediction Results |

```
{
    "domain": "f4ehs0td3ddgmu0doeslbl8vu86a5h6m.com",
    "seed": "slb.com",
    "meaningful_seg_ratio": 0.3333333333333333,
    "perc_longest_meaningful_str": 0.125,
    "pred_rslt": {
        "label_based": {
            "is_gauss_random": 1,
            "detail_info": {
...
```

FIG. 4

DETECTING RANDOM AND/OR ALGORITHMICALLY-GENERATED CHARACTER SEQUENCES IN DOMAIN NAMES

CROSS-REFERENCE TO RELATED APPLICATIONS

This application is a continuation of and claims priority to co-pending U.S. application Ser. No. 17/529,947, filed Nov. 18, 2021, and entitled, "Detecting Random and/or Algorithmically-Generated Character Sequences in Domain Names," which claims the benefit of and is a non-provisional of U.S. Provisional Patent Application Ser. No. 63/143,610, filed Jan. 29, 2021, and entitled "Detecting Random and/or Algorithmically-Generated Character Sequences In Domain Names." Each of the foregoing application(s) is incorporated by reference herein in its entirety.

TECHNICAL FIELD

Aspects of the disclosure relate to digital data processing systems, data processing methods, cybersecurity, and preventing unauthorized access to secure information systems and resources. In particular, one or more aspects of the disclosure relate to detecting random and/or algorithmically-generated character sequences in domain names.

BACKGROUND

An enterprise organization may seek to protect its legitimate domain(s) from being copied, impersonated, and/or otherwise maliciously used by external actors. To do this, the organization might monitor—or engage a cybersecurity firm to monitor—other domain names that might pose a risk to the organization, its domains, and/or its brands. This monitoring and the analysis that flows from it, however, may be a computationally expensive endeavor given the vast amount of data involved and the resources required to process it in an efficient and effective manner. Additionally, in such a domain discovery process, if there are actual organization domains that are short and/or not unique, these actual domains may collide with randomly generated domain names that do not pose a risk, at least in terms of an infringement on the organization's domain rights. In many instances, however, it may be difficult to filter out false positive matches with randomly generated domains, particularly when an organization has actual domains that are short and/or not unique.

SUMMARY

One or more aspects of the disclosure address one or more of these and/or other problems, and their associated technical implementation challenges, by providing systems, methods, computer-readable media, and/or other technology for detecting random and/or algorithmically-generated character sequences in domain names.

As an example of the analysis associated with one or more aspects illustrated below, a seed may be a starting point for a domain analysis—e.g., the seed "slb" for the domain "slb.com"—where the goal is to find infringing domains for an organization associated with the domain "slb.com." In this example, a domain "slbl.com" would generate a match that presents an infringement risk for which action may be taken, whereas a domain "asldkslb.com" would be considered a random string that does not pose a risk (and which therefore might not require further action).

When a randomly-generated domain name is caught in the analysis filter, an algorithm is needed to separate out whether the domain is actually random or not. If the domain is random, it is relatively more likely that the domain is not infringing on an organization's actual domain. Alternatively, if the domain is not random, it is relatively more likely that the domain is infringing on an organization's actual domain. In some instances, this likelihood-which may be algorithmically determined, as illustrated below-may be a factor in a larger domain discovery process and/or used by other cybersecurity systems and/or algorithms that are deployed to protect the organization's secure information systems and resources. In this example, the desired output may be one or more notifications that alert one or more users linked to the organization (e.g., the owner of "slb.com" in this example) about potentially infringing domains, phishing attempts, and/or other malicious sites. In facing this analysis problem, however, it might not be possible to train a simple classifier model that distinguishes between random names and actual names. So, instead, one or more aspects described in greater detail below provide techniques for decomposing domain names into segments and analyzing the segments to arrive at an overall analysis result (which may, e.g., indicate whether a given name is random or not random).

Moreover, one or more aspects described in greater detail below provide a flexible approach to this analysis problem, as they account for variability across different languages. For instance, beyond just classifying an input as being random vs. being an English word, some aspects may be extended to apply to international use cases with other languages (e.g., because the model is trained on one or more dictionaries and can adapt to the language of the dictionary used in the training process).

In accordance with one or more embodiments, a computing platform having at least one processor, a communication interface, and memory may train a machine learning model based on a set of semantically-meaningful words. Subsequently, the computing platform may receive a seed string and a set of domains to be analyzed in connection with the seed string. Based on the machine learning model, the computing platform may apply a classification algorithm to the seed string and the set of domains, where applying the classification algorithm to the seed string and the set of domains produces a classification result. Thereafter, the computing platform may store the classification result.

In some embodiments, the set of semantically-meaningful words may include words selected from a dictionary. In addition, training the machine learning model may include training the machine learning model based on the set of semantically-meaningful words and a set of random strings with the same length distribution as the set of semantically-meaningful words.

In some embodiments, training the machine learning model may include accessing a dictionary of words. Subsequently, based on accessing the dictionary of words, the computing platform may generate a plurality of counterpart samples for training purposes, where each counterpart sample is a scrambled version of a word from the dictionary of words.

In some embodiments, training the machine learning model may include training a bagging classifier associated with ensemble meta-algorithms.

In some embodiments, receiving the seed string and the set of domains to be analyzed in connection with the seed string may include receiving the seed string and the set of domains to be analyzed from a cybersecurity server or one or more user devices.

In some embodiments, receiving the seed string and the set of domains to be analyzed in connection with the seed string may include receiving a set of seed-domain string pairs to investigate.

In some embodiments, receiving the seed string and the set of domains to be analyzed in connection with the seed string may include preparing a feature vector for each string pair in the set of seed-domain string pairs.

In some embodiments, applying the classification algorithm to the seed string and the set of domains may include calculating similarity scores for each domain segment in the set of domains in view of all seed segments in the seed string and preliminarily classifying each domain segment as random or not-random based on its corresponding similarity score. Subsequently, the computing platform may input a set of domain segments preliminarily classified as random into the machine learning model to obtain a prediction score for each domain segment in the set of domain segments. Then, the computing platform may calculate a weighted summation based on the similarity scores and the prediction scores. Thereafter, the computing platform may calculate a weighted average based on the weighted summation, where the weighted average is a numerical value between 0 and 1 and indicative of whether a given domain is classified as random, indeterminate, or not-random.

In some embodiments, storing the classification result may include identifying a first domain as being classified as indeterminate and adding the first domain to set of domains requiring further investigation.

In some embodiments, storing the classification result may include identifying a second domain as being classified as not-random and generating an alert to an entity associated with the second domain.

In some embodiments, storing the classification result may include updating tuning data that causes the computing platform to improve modeling results associated with the machine learning model.

In some embodiments, the computing platform may send, via the communication interface, to a cybersecurity server, the classification result, where sending the classification result to the cybersecurity server causes the cybersecurity server to update one or more security algorithms.

In some embodiments, the computing platform may send, via the communication interface, to a user device, the classification result, where sending the classification result to the user device causes the user device to present an analysis user interface.

BRIEF DESCRIPTION OF THE DRAWINGS

The present disclosure is illustrated by way of example and not limited in the accompanying figures in which like reference numerals indicate similar elements and in which:

FIGS. 3 and 4 depict illustrative graphical user interfaces for detecting random and/or algorithmically-generated character sequences in domain names in accordance with one or more example embodiments.

DETAILED DESCRIPTION

Figure 1:
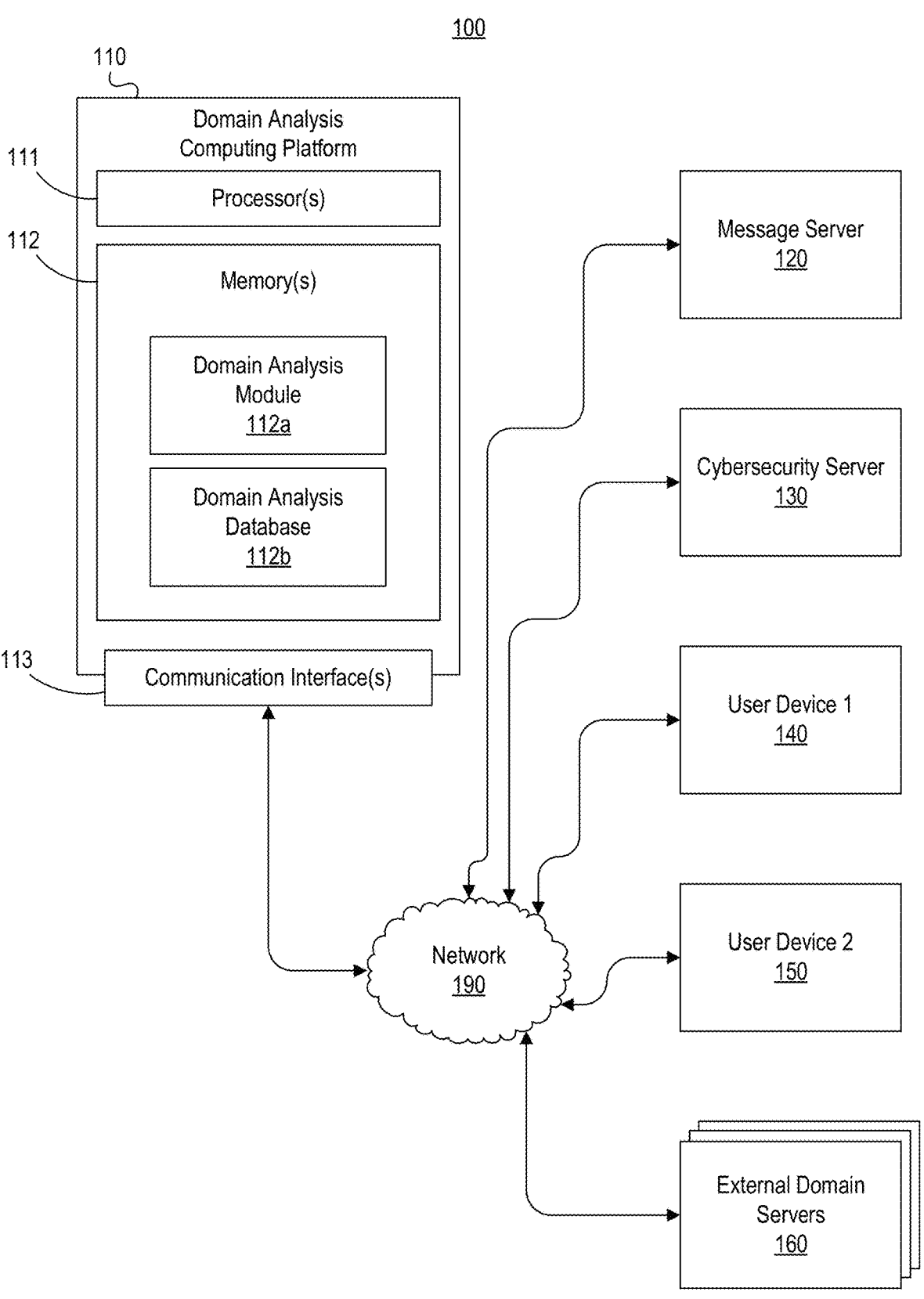
FIG. 1 depicts an illustrative operating environment for detecting random and/or algorithmically-generated character sequences in domain names in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

One or more aspects of the disclosure relate to systems and methods for identifying domain names that include character sequences that are random and/or algorithmically generated. Such identification may be particularly applicable in domain discovery processes in which a set of domains are monitored and/or analyzed to determine whether the domains are maliciously similar to a particular seed string (and, e.g., thereby pose an impersonation and/or infringement risk to the seed domain) or merely coincidentally similar to the seed string (and, e.g., thereby classifiable as indeterminate or not malicious).

For example, by implementing one or more aspects of the disclosure in a domain discovery analysis process, domains that include randomly-generated sequences of characters may be identified and subsequently removed as false positives from a set of domains being analyzed. In particular, in such a domain discovery analysis process, variations of a customer's domain name(s) may be identified and monitored so as to alert the customer about potentially infringing domains, phishing attempts, and/or other malicious sites. By applying one or more aspects of the disclosure to such a process, semantically-meaningful domain names (e.g., regular or real domain names) may be separated from random-looking domain names (e.g., algorithmic domain names).

As seen below, one or more aspects of the disclosure provide a multi-segment analysis process that employs statistics and machine learning to calculate a prediction probability score that may then be used to classify a domain (which may, e.g., be identified as a variant of a domain name being monitored, such as a domain of a customer) as random, indeterminate, or not random. If a domain under analysis is classified as random, this may indicate that the domain is not owned or operated by a legitimate business and/or might not have a legitimate purpose for being similar to a domain name (e.g., a seed domain) being monitored. In these instances, a takedown request and/or other action may be warranted. Alternatively, if the domain under analysis is classified as not random, this may indicate that the domain should not be excluded from being owned or operated by a legitimate business and may have a legitimate purpose for being similar to the domain name being monitored. If the domain is classified as indeterminate, further investigation may be needed.

Unlike conventional approaches to domain name analysis, one or more aspects of the disclosure effectively process domain names that include non-language sequences of characters and/or language-based sequences of characters, because some aspects involve splitting a domain under analysis into different segments and applying a similarity-based detection algorithm as well as a language-based classifier algorithm to the different segments (and weighting the results of the two algorithms to produce an overall result). In addition, using a seed string as a reference and/or factor in determining this classification further distinguishes one or more aspects of the disclosure from other potential approaches.

FIG. 1 depicts an illustrative operating environment for detecting random and/or algorithmically-generated character sequences in domain names in accordance with one or more example embodiments. Referring to FIG. 1, computing environment 100 may include various computer systems, computing devices, networks, and/or other operating infrastructure. For example, computing environment 100 may include domain analysis computing platform 110, message server 120, cybersecurity server 130, user device 140, user device 150, external domain servers 160, and network 190.

Network 190 may include one or more wired networks and/or one or more wireless networks that interconnect domain analysis computing platform 110, message server 120, cybersecurity server 130, user device 140, user device 150, external domain servers 160, and/or other computer systems and/or devices. In addition, each of domain analysis computing platform 110, message server 120, cybersecurity server 130, user device 140, user device 150, and external domain servers 160 may be special purpose computing devices configured to perform specific functions, as illustrated in greater detail below, and may include specific computing components such as processors, memories, communication interfaces, and/or the like.

Domain analysis computing platform 110 may include one or more processor(s) 111, one or more memory(s) 112, and one or more communication interface(s) 113. In some instances, domain analysis computing platform 110 may be made up of a plurality of different computing devices (e.g., a cloud-based server platform), which may be distributed within a single data center or a plurality of different data centers. In these instances, the one or more processor(s) 111, one or more memory(s) 112, and one or more communication interface(s) 113 included in domain analysis computing platform 110 may be part of and/or otherwise associated with the different computing devices that form domain analysis computing platform 110.

In one or more arrangements, processor(s) 111 may control operations of domain analysis computing platform 110. Memory(s) 112 may store instructions that, when executed by processor(s) 111, cause domain analysis computing platform 110 to perform one or more functions, as discussed below. Communication interface(s) 113 may include one or more wired and/or wireless network interfaces, and communication interface(s) 113 may connect domain analysis computing platform 110 to one or more networks (e.g., network 190) and/or enable domain analysis computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause domain analysis computing platform 110 to perform various functions) and/or databases (which may, e.g., store data used by domain analysis computing platform 110 in performing various functions). For example, memory(s) 112 may store and/or otherwise provide a domain analysis module 112a and a domain analysis database 112b. In some instances, domain analysis module 112a may store instructions that cause domain analysis computing platform 110 to execute one or more of the functions described herein. Additionally, domain analysis database 112b may store data that is used by domain analysis computing platform 110 in executing one or more of the functions described herein.

Message server 120 may include one or more processors, memories, communication interfaces, and/or other computer components. In addition, message server 120 may be configured to receive, process, and/or send email messages and/or other communications. For instance, message server 120 may be linked to an organization, such as a customer of a cybersecurity organization that may configure, deploy, and/or operate domain analysis computing platform 110. Additionally, message server 120 may provide domain names, uniform resource locators (URLs), message content, and/or other information to domain analysis computing platform 110 and/or other systems and/or devices for analysis.

Cybersecurity server 130 may include one or more processors, memories, communication interfaces, and/or other computer components. In addition, cybersecurity server 130 may be configured to monitor emails and/or other communications that are received, processed, and/or sent by message server 120. Additionally or alternatively, cybersecurity server 130 may be configured to send and/or otherwise provide domains and/or URLs for analysis to domain analysis computing platform 110 (e.g., based on the emails and/or other communications that are monitored by cybersecurity server 130).

User device 140 may include one or more processors, memories, communication interfaces, and/or other computer components. In addition, user device 140 may be configured to initiate training and/or analysis processes on domain analysis computing platform 110. Additionally or alternatively, user device 140 may be configured to generate, display, and/or otherwise present one or more graphical user interfaces that include domain analysis results information and/or other information.

User device 150 may include one or more processors, memories, communication interfaces, and/or other computer components. In addition, user device 150 may be configured to initiate training and/or analysis processes on domain analysis computing platform 110. Additionally or alternatively, user device 150 may be configured to generate, display, and/or otherwise present one or more graphical user interfaces that include domain analysis results information and/or other information. In some instances, user device 150 may be linked to a different user (e.g., a second user) than user device 140 (which may, e.g., be linked to a first user).

External domain servers 160 may include one or more processors, memories, communication interfaces, and/or other computer components. In some arrangements, external domain servers 160 may include multiple computer servers (e.g., physical servers and/or virtual servers) that may be linked to various different domains. Such domains may, for instance, be analyzed by domain analysis computing platform 110, as discussed in greater detail below. In some instances, domains and/or other resources hosted by external domain servers 160 may be crawled by domain analysis computing platform 110 and/or other computer systems to support analysis processes performed by domain analysis computing platform 110.

Figure 2A:
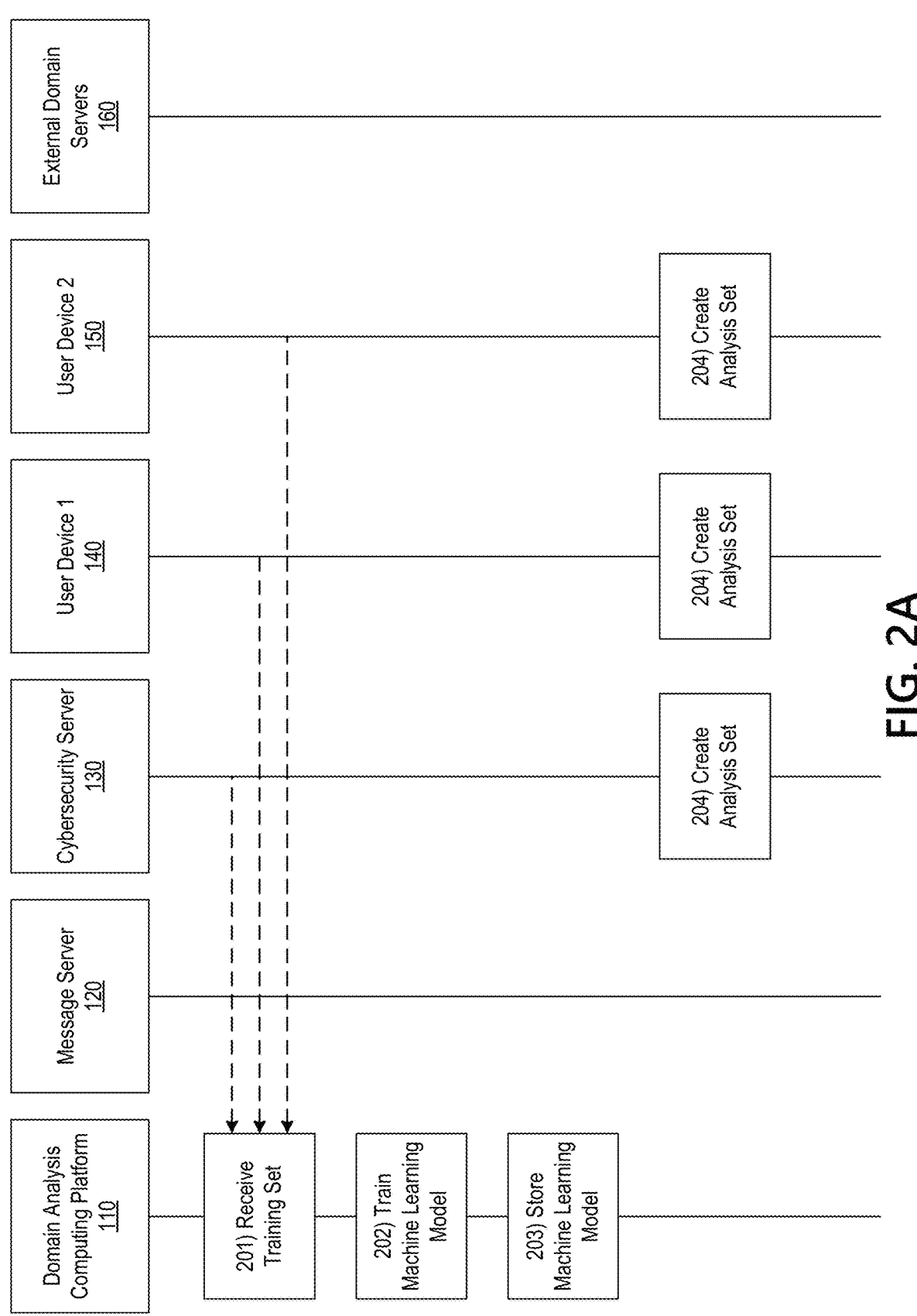
FIGS. 2A-2C depict an illustrative event sequence for detecting random and/or algorithmically-generated character sequences in domain names in accordance with one or more example embodiments.
Figure 2B:
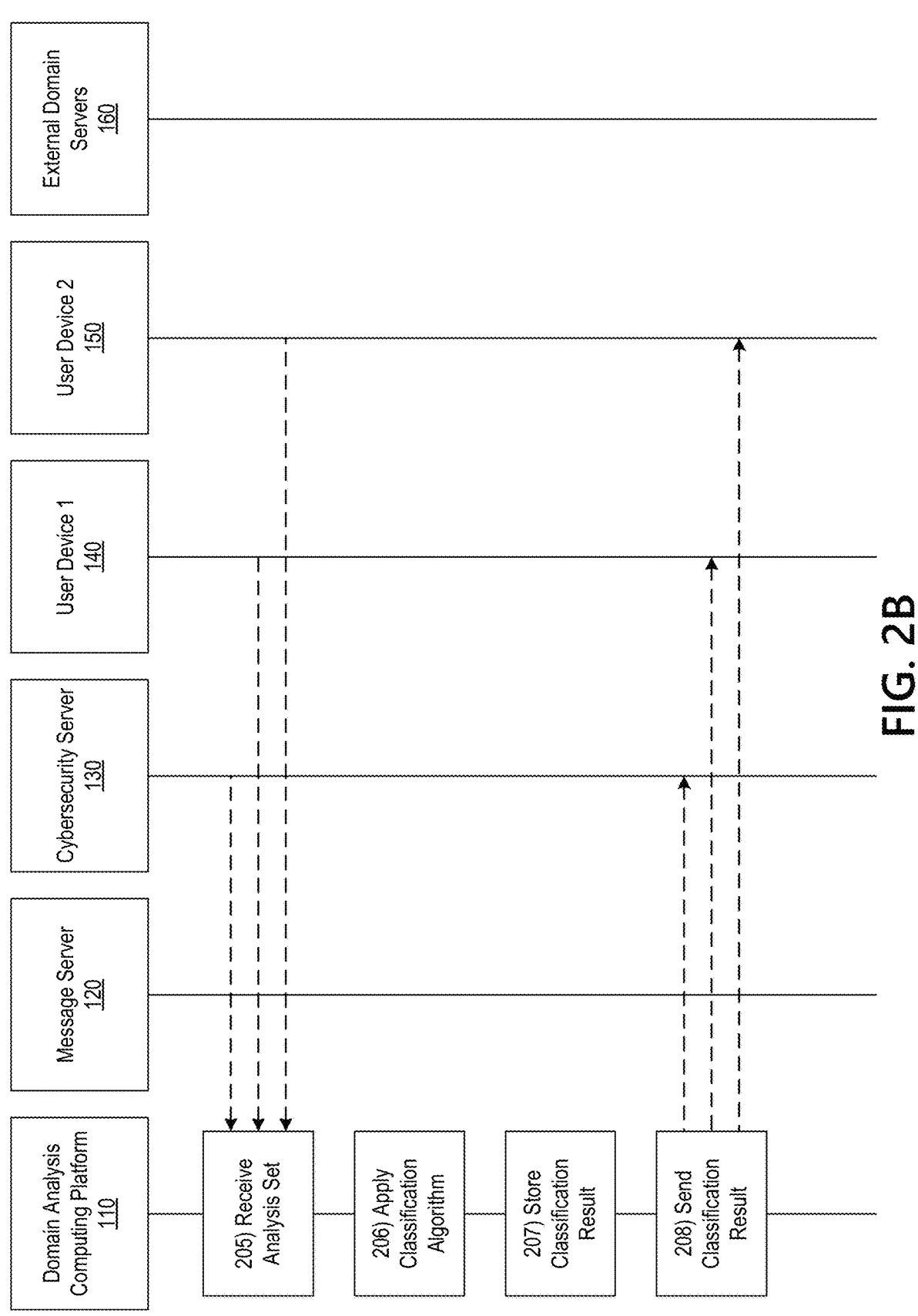
Figure 2C:
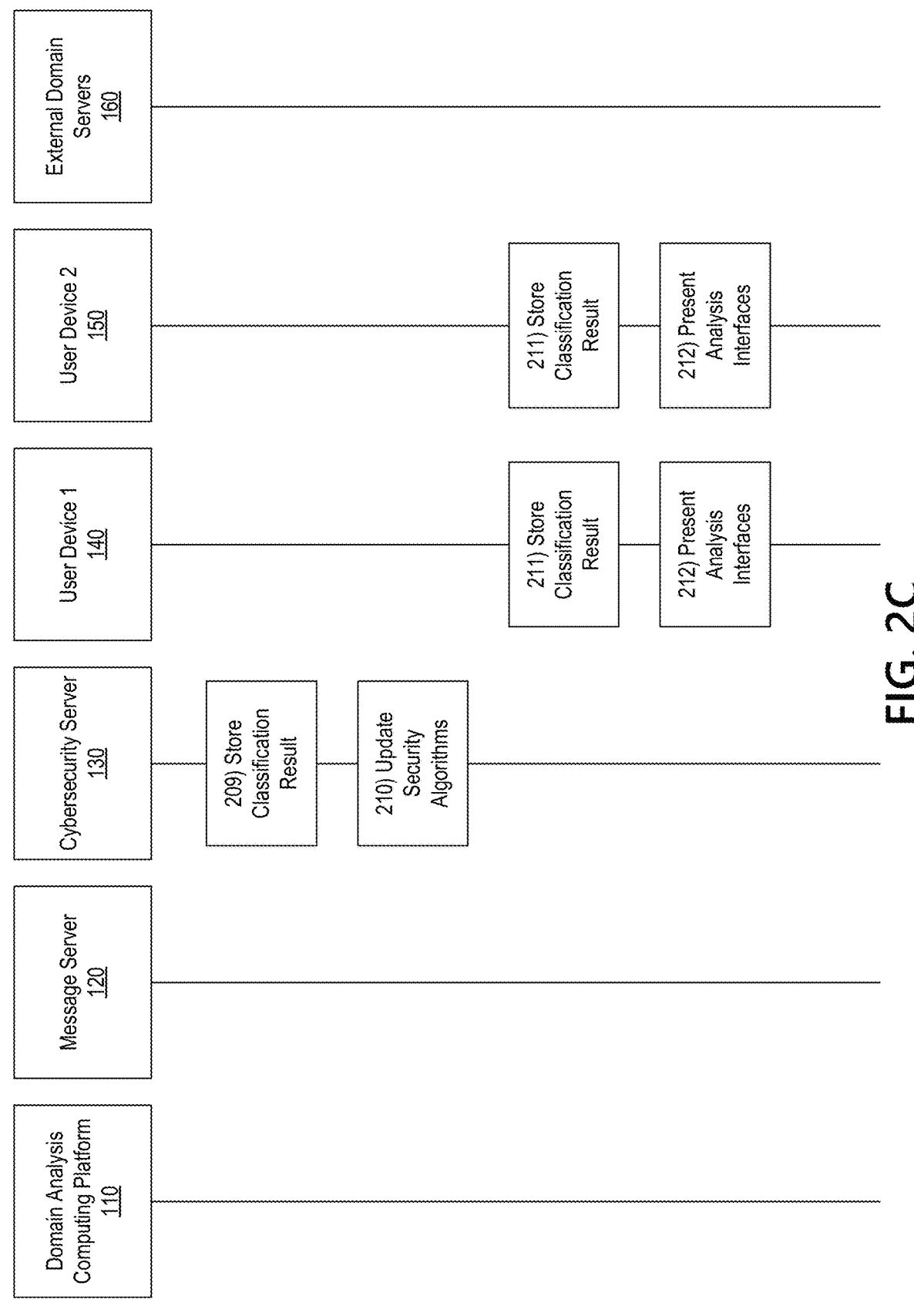

FIGS. 2A-2C depict an illustrative event sequence for detecting random and/or algorithmically-generated character sequences in domain names in accordance with one or more example embodiments. Referring to FIG. 2A, at step 201, domain analysis computing platform 110 may receive a training data set from cybersecurity server 130, user device 140, and/or user device 150. At step 202, domain analysis computing platform 110 may train one or more machine learning models based on the training data set received from cybersecurity server 130, user device 140, and/or user device 150. For example, at step 202, domain analysis computing platform 110 may train a machine learning model based on a set of semantically-meaningful words.

For example, a machine learning model may be built and/or otherwise trained (e.g., by domain analysis computing platform 110) based on a set of known, semantically-meaningful words. Such semantically-meaningful words may, for instance, include words in English and/or any other language and may be obtained from one or more dictionaries. In building the machine learning model, domain analysis computing platform 110 may also add and/or otherwise incorporate into the model various random strings with the same length distribution of the set of known, semantically-meaningful words. Such random strings may, for instance, be generated by domain analysis computing platform 110 based on the set of known, semantically-meaningful words.

In some instances, in building the model, domain analysis computing platform 110 may receive and/or otherwise download a dictionary of words. Each word in the dictionary may be assigned a label=0 by domain analysis computing platform 110, for purposes of training the model. In addition, for purposes of training the model, a corresponding sample with label=1 may be generated by domain analysis computing platform 110 for each word in the dictionary, using a random string generation algorithm. In this way, each word in the dictionary may be scrambled by domain analysis computing platform 110 to form a counterpart sample for training and verification purposes.

Subsequently, in building the model, domain analysis computing platform 110 may form a plurality of feature vectors. For example, a feature vector may be formed by domain analysis computing platform 110 by combining different n-grams from each word string and each random string that are generated. These feature vectors (which may, e.g., correspond to label=0 and label=1) may then be used by domain analysis computing platform 110 in building a model for random string classification. For example, Naïve Bayes is a computationally efficient learning algorithm, and it may be used by domain analysis computing platform 110 in building a Multivariate Event Model for addressing one or more aspects of the string classification problem described herein.

Thereafter, in building the model, domain analysis computing platform 110 may verify one or more aspects of the model by performing a verification process. Based on the classification accuracy of the trained model (which may, e.g., be determined by domain analysis computing platform 110 during the verification process), the feature selection and the feature vector preparation may be optimized iteratively by domain analysis computing platform 110. Then, once the training process and the verification process are completed, the trained model may be stored, saved, and/or otherwise output by domain analysis computing platform 110. In some instances, the final trained model (which may, e.g., be stored, saved, and/or otherwise output by domain analysis computing platform 110) may be a bagging classifier associated with ensemble meta-algorithms, which may reduce variance and avoid overfitting. In some instances, in outputting the model, domain analysis computing platform 110 may load the trained model as a random domain classifier and may place the model on standby.

In some embodiments, the set of semantically-meaningful words may include words selected from a dictionary, and training the machine learning model may include training the machine learning model based on the set of semantically-meaningful words and a set of random strings with the same length distribution as the set of semantically-meaningful words. For example, the set of semantically-meaningful words (which may, e.g., be used by domain analysis computing platform 110 at step 202 in training the machine learning model) may include words selected from a dictionary (e.g., a dataset corresponding to an English-language dictionary and/or a dictionary in an alternate language). In addition, in training the machine learning model, domain analysis computing platform 110 may train the machine learning model based on the set of semantically-meaningful words and a set of random strings with the same length distribution as the set of semantically-meaningful words, as discussed above.

In some embodiments, training the machine learning model may include: accessing a dictionary of words; and based on accessing the dictionary of words, generating a plurality of counterpart samples for training purposes, where each counterpart sample is a scrambled version of a word from the dictionary of words. For example, in training the machine learning model at step 202, domain analysis computing platform 110 may access a dictionary of words (e.g., by accessing and/or downloading one or more dictionary files from one or more remote sources and/or loading such dictionary files from one or more databases). Additionally, based on accessing the dictionary of words, domain analysis computing platform 110 may generate a plurality of counterpart samples for training purposes, where each counterpart sample is a scrambled version of a word from the dictionary of words. As illustrated above, these counterpart samples may function as 'random' strings that can be used in training the model (e.g., by applying a label of 1 to these 'random' strings) in addition to the corresponding 'actual' strings (which may, e.g., be real words from the dictionary to which a label of 0 is applied). The "0" and "1" labels applied to the different strings may be scores used by domain analysis computing platform 110 in training the model, because ultimately, when the model is applied, domain analysis computing platform 110 may output scores closer to 1 when a string is likely random and scores closer to 0 when a string is likely not random.

In some embodiments, training the machine learning model may include training a bagging classifier associated with ensemble meta-algorithms. For example, in training the machine learning model at step 202, domain analysis computing platform 110 may train a bagging classifier associated with ensemble meta-algorithms. Such a bagging classifier may, for instance, function as an ensemble classifier that fits multiple different estimators onto different subsets of the training data set. In some instances, such a bagging classifier may be particularly well adapted to the problem of distinguishing random strings from not-random strings.

At step 203, domain analysis computing platform 110 may store the machine learning model. For example, at step 203, domain analysis computing platform 110 may store the machine learning model trained at step 202. At step 204, one or more of cybersecurity server 130, user device 140, and/or user device 150 may create an analysis set. Such an analysis set may, for instance, include one or more domains to be analyzed by domain analysis computing platform 110 as well as other information to be analyzed (e.g., seed strings and/or other information).

Referring to FIG. 2B, at step 205, domain analysis computing platform 110 may receive the analysis set from one or more of cybersecurity server 130, user device 140, and/or user device 150. For example, at step 205, domain analysis computing platform 110 may receive a seed string and a set of domains to be analyzed in connection with the seed string. The seed string and the set of domains may, for instance, be received from one or more of cybersecurity server 130, user device 140, and/or user device 150 based on domains that have been identified during cybersecurity monitoring and/or domain discovery processes.

For example, domain analysis computing platform 110 may receive information that includes a set of (seed, domain) string pairs and subsequently may prepare feature vectors based on this information. For instance, domain analysis computing platform 110 may receive information identifying one or more (seed, domain) string pairs to investigate. This information may, in some instances, come from a separate process and/or system. In preparing a feature vector for each received (seed, domain) string pair, domain analysis computing platform 110 may decompose the seed string to a list of segments, and decompose the domain string to a list of segments. In some instances, domain analysis computing platform 110 may perform this decomposition using Natural Language Toolkit (NLTK) functionalities. As an example, for a seed string of 'slb', the matched domain strings 'f4ehs0td3ddgmu0doeslb18vu86a5h6m' and 'g674slb355pbuhaum1ed19a6mgbbife0' may be decomposed to ['f4ehs0td3ddgmu0', 'does', 'g674slb355pbuhaum1ed19a6mgbbife0] and [g674slb355pbuhaum1ed19a6', 'mgbbife0'] respectively. For each domain segment, the same features as used during the modeling process may be selected by domain analysis computing platform 110, for instance, and the same feature extraction techniques as used during the modeling process may also be applied by domain analysis computing platform 110 to prepare the corresponding feature vector.

In some embodiments, receiving the seed string and the set of domains to be analyzed in connection with the seed string may include receiving the seed string and the set of domains to be analyzed from a cybersecurity server or one or more user devices. For example, in receiving the seed string and the set of domains to be analyzed in connection with the seed string at step 205, domain analysis computing platform 110 may receive the seed string and the set of domains to be analyzed from a cybersecurity server (e.g., cybersecurity server 130) or one or more user devices (e.g., user device 140, user device 150), as illustrated above.

In some embodiments, receiving the seed string and the set of domains to be analyzed in connection with the seed string may include receiving a set of seed-domain string pairs to investigate. For example, in receiving the seed string and the set of domains to be analyzed in connection with the seed string at step 205, domain analysis computing platform 110 may receive a set of seed-domain string pairs to investigate, as illustrated above.

In some embodiments, receiving the seed string and the set of domains to be analyzed in connection with the seed string may include preparing a feature vector for each string pair in the set of seed-domain string pairs. For example, in receiving the seed string and the set of domains to be analyzed in connection with the seed string at step 205, domain analysis computing platform 110 may prepare a feature vector for each string pair in the set of seed-domain string pairs. Domain analysis computing platform 110 may prepare such feature vectors by decomposing the seed string to a first list of segments and decomposing the domain string to a second list of segments, as illustrated above.

At step 206, domain analysis computing platform 110 may apply a classification algorithm. For example, at step 206, based on the machine learning model (which may, e.g., have been trained at step 202 and stored at step 203), domain analysis computing platform 110 may apply a classification algorithm to the seed string and the set of domains, and applying the classification algorithm to the seed string and the set of domains may produce a classification result. For instance, domain analysis computing platform 110 may classify the identified domain name as random or not random under the given reference information of the seed string.

In some instances, domain analysis computing platform 110 may analyze multiple seed strings at once (e.g., substantially contemporaneously). In these instances, the input (which may, e.g., be provided by domain analysis computing platform 110 to the classification algorithm) may be a list of domain segments followed by a set of seed segment lists. Each seed segment list may be generated by domain analysis computing platform 110 from one of the multiple seed strings.

In some instances, in applying the classification algorithm at step 206, domain analysis computing platform 110 may calculate one or more similarity scores to make preliminary classifications and subsequently calculate additional scores that drive the classification of a given domain as random, indeterminate, or not-random, as illustrated in greater detail below.

In particular, first, in applying the classification algorithm at step 206, similarity scores may be calculated by domain analysis computing platform 110 for each domain segment in view of all the seed segments of a seed string. For instance, a string similarity algorithm used with a domain filter may be applied by domain analysis computing platform 110 to calculate a similarity score between 0.0 and 1.0 for two given segment strings. Alternatively, a fuzzy string matching algorithm may be used by domain analysis computing platform 110 to find the Levenshtein ratio, which may be used as the similarity score. In some instances, additional or alternative methods may be used by domain analysis computing platform 110 to calculate such a similarity score.

In one or more arrangements, if the similarity score for a given domain segment and a seed string (which may, e.g., be the largest similarity score between the domain segment and each seed segment of the seed string and which may, e.g., also be referred to as the max score) is greater than a predetermined threshold (e.g., $>=0.5$), the domain segment may be classified by domain analysis computing platform 110 as not random. This means that if a domain segment is very similar to any given seed segment, the domain segment might not be treated as likely to contribute to a random domain name. Relatedly, the prediction score in instances where the domain segment is classified as random may be defined as (1.0—the max score).

In some instances, to simplify the analysis, the operator of 'is_contained' or 'is_equal' may be used by domain analysis computing platform 110 to check if the domain segment is random. For example, if a domain segment is the same as at least one of the seed segments of the seed string, the prediction score of the domain segment being random may be zero.

Alternatively, if the similarity score for the given domain segment is not greater than the predetermined threshold (e.g., <0.5), the domain segment may be further analyzed by domain analysis computing platform 110 using the trained model to determine a prediction score for the segment, as illustrated in greater detail below.

Second, in applying the classification algorithm at step 206, for all domain segments that were not classified as 'not random' in the first step of applying the classification algorithm above, such remaining domain segments may be input by domain analysis computing platform 110 into the trained model, which in turn may output a prediction score (between 0.0 and 1.0) for each segment, for instance. The practical effect of this prediction score may be that if a given domain segment is not phonetically similar to a word in the dictionary (which may, e.g., be in English and/or in other languages, as noted above), the segment is more likely to be a random segment of a domain being analyzed.

Third, in applying the classification algorithm at step 206, a weighted summation of the scores obtained in the first and second steps discussed above may be calculated by domain analysis computing platform 110. The weights may, for instance, be determined by domain analysis computing platform 110 using a formula in which weight=length(domain segment)/length(domain string).

Fourth, in applying the classification algorithm at step 206, a weighted average may be computed by domain analysis computing platform 110 based on the weighted summation. This weighted average then may, for instance, have a value between 0.0 and 1.0. This value may indicate whether a given domain is classified by domain analysis computing platform 110 as random, indeterminate, or not random, given a particular seed string as a reference. In practice, a value less than $0.5-\varepsilon$ may indicate that a particular domain is classified as not random, a value in $[0.5-\varepsilon, 0.5+\varepsilon]$ may indicate that a particular domain is classified as indeterminate, and a value greater than $0.5+\varepsilon$ may indicate that a particular domain is classified as random. In some instances, domain analysis computing platform 110 may set $\varepsilon=0.01$.

A sample of the prediction results that may be produced by domain analysis computing platform 110 in performing the analysis process described above is illustrated in TABLE 1 below. In particular, and as seen in TABLE 1, domain analysis computing platform 110 may analyze the domain "f4chs0td3ddgmu0doeslb18vu86a5h6m.com" in view of the seed string "slb.com" and may obtain a final score of 0.8752362520413002 and therefore classify the domain as random. As also seen in TABLE, domain analysis computing platform 110 may analyze the domain "backgroundcheckexpert.com" in view of the seed string "backgroundchecks.com" and may obtain a final score 8.368724470440051e-11 and therefore classify the domain as not-random.

TABLE 1

Sample Prediction Results &Related Code

```
Command 1:
python3 prediction.py f4ehs0td3ddgmu0,does, lbl8vu86a5h6m slb
Result 1:
output:
{
    "domain": "f4ehs0td3ddgmu0doeslbl8vu86a5h6m.com",
    "seed": "slb.com",
    "meaningful_seg_ratio": 0.3333333333333333,
    "perc_longest_meaningful_str": 0.125,
    "pred_rslt": {
        "label_based": {
            "is_gauss_random": 1,
```

TABLE 1-continued

Sample Prediction Results &Related Code

```
        "detail_info": {
            "pred_label_list": [
                1,
                0,
                1
            ],
            "gauss_random_prob": 0.875
        }
    },
    "prob_based": {
        "is_gauss_random": 1,
        "detail_info": {
            "pred_prob_list": [
                [
                    2.7052278360811256e-46,
                    1.0
                ],
                [
                    0.9981099836695977,
                    0.001890016330401916
                ],
                [
                    8.442878838712842e-47,
                    1.0
                ]
            ],
            "gauss_random_prob": 0.8752362520413002
        }
    }
}
}
Command 2:
python3 prediction.py background,check,expert background,checks
Result 2:
output:
{
    "domain": "backgroundcheckexpert.com",
    "seed": "backgroundchecks.com",
    "meaningful_seg_ratio": 1.0,
    "perc_longest_meaningful_str": 0.47619047619047616,
    "pred_rslt": {
        "label_based": {
            "is_gauss_random": 0,
            "detail_info": {
                "pred_label_list": [
                    0,
                    0,
                    0
                ],
                "gauss_random_prob": 0.0
            }
        },
        "prob_based": {
            "is_gauss_random": 0,
            "detail_info": {
                "pred_prob_list": [
                    [
                        1.0,
                        0.0
                    ],
                    [
                        0.9999999996485229,
                        3.5147023219841334e-10
                    ],
                    [
                        0.9999999999999858,
                        1.3496300057343526e-14
                    ]
                ],
                "gauss_random_prob": 8.368724470440051e-11
            }
        }
    }
}
```

In some embodiments, applying the classification algorithm to the seed string and the set of domains may include: calculating similarity scores for each domain segment in the set of domains in view of all seed segments in the seed string and preliminarily classifying each domain segment as random or not-random based on its corresponding similarity score; inputting a set of domain segments preliminarily classified as random into the machine learning model to obtain a prediction score for each domain segment in the set of domain segments; calculating a weighted summation based on the similarity scores and the prediction scores; and calculating a weighted average based on the weighted summation, where the weighted average is a numerical value between 0 and 1 and indicative of whether a given domain is classified as random, indeterminate, or not-random. For example, in applying the classification algorithm to the seed string and the set of domains at step 206, domain analysis computing platform 110 may calculate similarity scores for each domain segment in the set of domains in view of all seed segments in the seed string and may preliminarily classify each domain segment as random or not-random based on its corresponding similarity score, as illustrated above. Subsequently, domain analysis computing platform 110 may input a set of domain segments preliminarily classified as random into the machine learning model to obtain a prediction score for each domain segment in the set of domain segments, as illustrated above. Then, domain analysis computing platform 110 may calculate a weighted summation based on the similarity scores and the prediction scores. Thereafter, domain analysis computing platform 110 may calculate a weighted average based on the weighted summation, where the weighted average is a numerical value between 0 and 1 and indicative of whether a given domain is classified as random, indeterminate, or not-random, as illustrated above.

At step 207, domain analysis computing platform 110 may store the classification result. For example, at step 207, domain analysis computing platform 110 may store the classification result produced by domain analysis computing platform 110 at step 206. In some instances, in storing the classification result, domain analysis computing platform 110 may update one or more datasets based on the classification process described above. For example, if a domain name is classified as indeterminate, domain analysis computing platform 110 may add the domain name to (or otherwise include the domain name in) a dataset of domains requiring further investigation. Additionally or alternatively, domain analysis computing platform 110 may generate one or more alerts and/or reports to report the domain name (e.g., to a customer or organization that might experience an infringement risk from the domain name). In instances in which an indeterminate domain name is confirmed as being either random or not random, such a domain name may be added by domain analysis computing platform 110 to a database for training to improve modeling results during a next iteration of the classification algorithm being executed.

In some embodiments, storing the classification result may include identifying a first domain as being classified as indeterminate and adding the first domain to set of domains requiring further investigation. For example, in storing the classification result at step 207, domain analysis computing platform 110 may identify a first domain as being classified as indeterminate and may add the first domain to set of domains requiring further investigation, as illustrated above.

In some embodiments, storing the classification result may include identifying a second domain as being classified as not-random and generating an alert to an entity associated with the second domain. For example, in storing the classification result at step 207, domain analysis computing platform 110 may identify a second domain as being classified as not-random and may generate an alert to an entity associated with the second domain, as illustrated above.

In some embodiments, storing the classification result may include updating tuning data that causes the computing platform to improve modeling results associated with the machine learning model. For example, in storing the classification result at step 207, domain analysis computing platform 110 may update tuning data that causes domain analysis computing platform 110 to improve modeling results associated with the machine learning model, as illustrated above.

At step 208, domain analysis computing platform 110 may send the classification result to one or more servers, devices, and/or other systems (e.g., cybersecurity server 130, user device 140, user device 150. For example, at step 208, domain analysis computing platform 110 may send, via the communication interface (e.g., communication interface 113), to a cybersecurity server (e.g., cybersecurity server 130), the classification result. In addition, by sending the classification result to the cybersecurity server (e.g., cybersecurity server 130), domain analysis computing platform 110 may cause the cybersecurity server (e.g., cybersecurity server 130) to update one or more security algorithms. Such security algorithms may, for instance, be executed by cybersecurity server 130 in performing cybersecurity monitoring and/or domain discovery processes. Additionally or alternatively, at step 208, domain analysis computing platform 110 may send, via the communication interface (e.g., communication interface 113), to a user device (e.g., user device 140, user device 150), the classification result. In addition, by sending the classification result to the user device (e.g., user device 140, user device 150) domain analysis computing platform 110 may cause the user device (e.g., user device 140, user device 150) to present an analysis user interface. Such a user interface may, for instance, be presented by user device 140 and/or user device 150 to allow a user to view one or more results of the domain analysis processes discussed above.

Referring to FIG. 2C, at step 209, cybersecurity server 130 may store the classification result received from domain analysis computing platform 110. At step 210, cybersecurity server 130 may update one or more security algorithms based on the classification result received from domain analysis computing platform 110. In some instances, in updating the one or more security algorithms based on the classification result received from domain analysis computing platform 110 at step 209, cybersecurity server 130 may trigger and/or otherwise cause one or more alerts to be generated, displayed, and/or otherwise presented (e.g., to warn a customer or organization about a potentially infringing domain). For instance, domain analysis computing platform 110 and/or cybersecurity server 130 may trigger and/or otherwise cause a user device to display and/or otherwise present a graphical user interface similar to graphical user interface 300, which is illustrated in FIG. 3. As seen in FIG. 3, graphical user interface 300 may include text and/or other information indicating that a potentially infringing domain has been identified and one or more user-selectable options that allow a user to access additional information about the domain and/or the analysis process (e.g., "A potentially infringing domain name has been detected. Our domain security support team is working to remediate the situation and will contact you with a status update soon.").

At step 211, user device 140 and/or user device 150 may store the classification result received from domain analysis computing platform 110. At step 212, user device 140 and/or user device 150 may display and/or otherwise present one or more analysis interfaces based on the classification result received from domain analysis computing platform 110. For example, at step 212, user device 140 and/or user device 150 may display and/or otherwise present a graphical user interface similar to graphical user interface 400, which is illustrated in FIG. 4. As seen in FIG. 4, graphical user interface 400 may include text and/or other information indicating one or more prediction results produced by domain analysis computing platform 110 during a domain analysis process and/or one or more user-selectable options that allow a user to access and/or control particular elements of the analysis process.

In some arrangements, aspects of the approach described above might not require efforts to collect and label a relatively large set of real domain name strings for modeling. This may, for instance, provide advantages over alternative and/or conventional approaches to domain name analysis.

In some arrangements, the input to the predictor/classifier may be a two-element tuple: ([domain segment 1, domain segment 2, . . . ], [seed segment 1, seed segment 2, . . . ]). For example, in applying the classification algorithm at step 206, domain analysis computing platform 110 may input such a two-element tuple into the machine learning model in applying the classification algorithm described above.

In some arrangements, if a seed string is not given or is otherwise unavailable for the four-part prediction/classification process described above with respect to step 206, the first step of the four-part analysis process discussed above (where, e.g., a similarity score is calculated to make a preliminary classification) may be skipped by domain analysis computing platform 110 and all domain segments may be analyzed by domain analysis computing platform 110 using the second step of the analysis process discussed above (where, e.g., the remaining segments are input into the trained model).

In some arrangements, where a sufficiently large set of 'good' normal domain strings and a sufficiently large set of 'bad' random domain strings are available for training and trained model verification, the segment decomposition processes described above might not be required and thus might not be performed by domain analysis computing platform 110. Instead, domain analysis computing platform 110 may analyze the whole domain string and seed string as two single-element lists. In these instances, the input to the classifier may become a two-element tuple of ([domain string], [seed string]). This may serve as one base model in instances where an ensemble approach is used.

Figure 5:
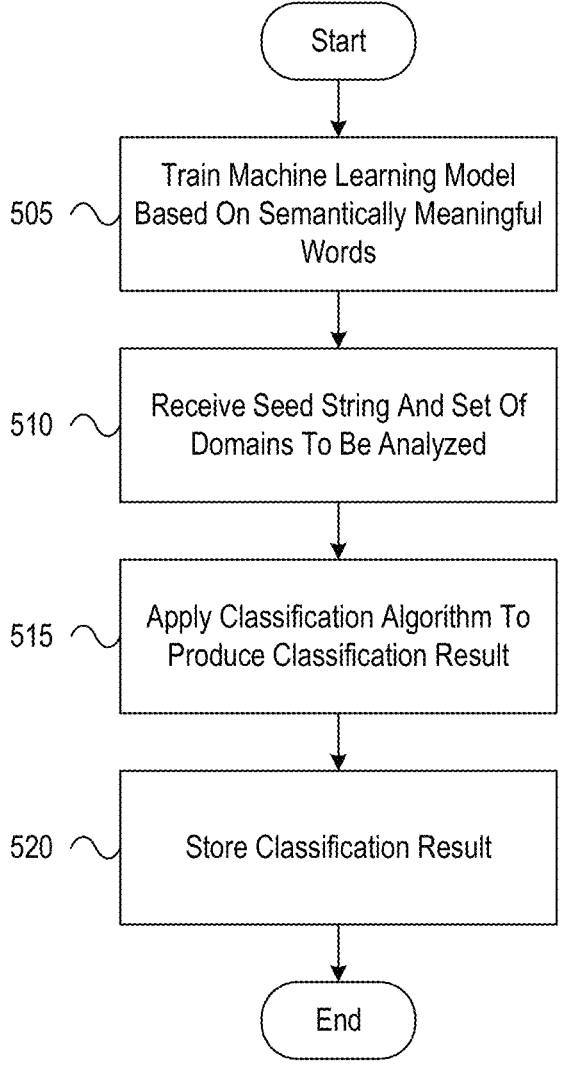
FIG. 5 depicts an illustrative method for detecting random and/or algorithmically-generated character sequences in domain names in accordance with one or more example embodiments.

FIG. 5 depicts an illustrative method for detecting random and/or algorithmically-generated character sequences in domain names in accordance with one or more example embodiments. Referring to FIG. 5, at step 505, a computing platform having at least one processor, a communication interface, and memory may train a machine learning model based on a set of semantically-meaningful words. At step 510, the computing platform may receive a seed string and a set of domains to be analyzed in connection with the seed string. At step 515, based on the machine learning model, the computing platform may apply a classification algorithm to the seed string and the set of domains, where applying the classification algorithm to the seed string and the set of domains produces a classification result. At step 520, the computing platform may store the classification result.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

US 12,694,224 B2

17

What is claimed is:

1. A computing platform, comprising:
at least one processor;
a communication interface; and
memory storing computer-readable instructions that, when executed by the at least one processor, cause the computing platform to:
train a machine learning model based on a set of semantically-meaningful words, wherein training the machine learning model includes:
accessing a dictionary of words;
based on accessing the dictionary of words, generating a plurality of counterpart samples for training purposes;
receive a seed string and a set of domains to be analyzed in connection with the seed string;
based on the machine learning model, apply a classification algorithm to the seed string and the set of domains, wherein applying the classification algorithm to the seed string and the set of domains produces a classification result and includes:
calculating similarity scores for domain segments in the set of domains in view of seed segments in the seed string;
preliminarily classifying each domain segment based on its corresponding similarity score;
inputting domain segments preliminarily classified as random into the machine learning model to obtain a prediction score; and
determining, based on a weighted summation of the similarity score and the prediction score, whether a given domain is classified as random or not-random; and
store the classification result.

2. The computing platform of claim 1, wherein the set of semantically meaningful words is selected from the dictionary of words.

3. The computing platform of claim 1, wherein training the machine learning model further comprises training a bagging classifier associated with ensemble meta-algorithms.

4. The computing platform of claim 1, wherein receiving the seed string and the set of domains to be analyzed in connection with the seed string comprises receiving the seed string and the set of domains to be analyzed from a cybersecurity server or one or more user devices.

5. The computing platform of claim 1, wherein receiving the seed string and the set of domains to be analyzed in connection with the seed string comprises receiving a set of seed-domain string pairs to investigate.

6. The computing platform of claim 5, wherein receiving the seed string and the set of domains to be analyzed in connection with the seed string comprises preparing a feature vector for each string pair in the set of seed-domain string pairs.

7. The computing platform of claim 1, wherein determining whether a given domain is classified as random or not-random further includes:
calculating a weighted average based on the weighted summation, wherein the weighted average is a numerical value between 0 and 1 and indicative of whether a given domain is classified as random, indeterminate, or not-random.

8. The computing platform of claim 1, wherein storing the classification result comprises identifying a first domain as being classified as indeterminate and adding the first domain to set of domains requiring further investigation.

9. The computing platform of claim 1, wherein storing the classification result comprises identifying a second domain as being classified as not-random and generating an alert to an entity associated with the second domain.

10. The computing platform of claim 1, wherein storing the classification result comprises updating tuning data that causes the computing platform to improve modeling results associated with the machine learning model.

11. The computing platform of claim 1, wherein the memory stores additional computer-readable instructions that, when executed by the at least one processor, cause the computing platform to:
send, via the communication interface, to a cybersecurity server, the classification result, wherein sending the classification result to the cybersecurity server causes the cybersecurity server to update one or more security algorithms.

12. The computing platform of claim 1, wherein the memory stores additional computer-readable instructions that, when executed by the at least one processor, cause the computing platform to:
send, via the communication interface, to a user device, the classification result, wherein sending the classification result to the user device causes the user device to present an analysis user interface.

13. The computing platform of claim 1, wherein each counterpart sample is a scrambled version of a word from the dictionary of words.

14. A method, comprising:
at a computing platform comprising at least one processor, a communication interface, and memory:
training, by the at least one processor, a machine learning model based on a set of semantically-meaningful words, wherein training the machine learning model includes:
accessing a dictionary of words;
based on accessing the dictionary of words, generating a plurality of counterpart samples for training purposes;
receiving, by the at least one processor, a seed string and a set of domains to be analyzed in connection with the seed string;
based on the machine learning model, applying, by the at least one processor, a classification algorithm to the seed string and the set of domains, wherein applying the classification algorithm to the seed string and the set of domains produces a classification result and includes:
calculating similarity scores for domain segments in the set of domains in view of seed segments in the seed string;
preliminarily classifying each domain segment based on its corresponding similarity score;
inputting domain segments preliminarily classified as random into the machine learning model to obtain a prediction score; and
determining, based on a weighted summation of the similarity score and the prediction score, whether a given domain is classified as random or not-random; and
storing, by the at least one processor, the classification result.

15. The method of claim 14, wherein the set of semantically meaningful words is selected from the dictionary of words.

16. The method of claim 14, wherein training the machine learning model comprises training a bagging classifier associated with ensemble meta-algorithms.

17. The method of claim 14, wherein receiving the seed string and the set of domains to be analyzed in connection with the seed string comprises receiving the seed string and the set of domains to be analyzed from a cybersecurity server or one or more user devices.

18. The method of claim 14, wherein receiving the seed string and the set of domains to be analyzed in connection with the seed string comprises receiving a set of seed-domain string pairs to investigate.

19. The method of claim 14, wherein each counterpart sample is a scrambled version of a word from the dictionary of words.

20. One or more non-transitory computer-readable media storing instructions that, when executed by a computing platform comprising at least one processor, a communication interface, and memory, cause the computing platform to:

train a machine learning model based on a set of semantically-meaningful words, wherein training the machine learning model includes:

accessing a dictionary of words;

based on accessing the dictionary of words, generating a plurality of counterpart samples for training purposes,;

receive a seed string and a set of domains to be analyzed in connection with the seed string;

based on the machine learning model, apply a classification algorithm to the seed string and the set of domains, wherein applying the classification algorithm to the seed string and the set of domains produces a classification result and includes:

calculating similarity scores for domain segments in the set of domains in view of seed segments in the seed string;

preliminarily classifying each domain segment based on its corresponding similarity score;

inputting domain segments preliminarily classified as random into the machine learning model to obtain a prediction score; and determining, based on a weighted summation of the similarity score and the prediction score, whether a given domain is classified as random or not-random; and store the classification result.

\* \* \* \* \*